(12) United States Patent
Lai et al.

(10) Patent No.: US 8,060,065 B1
(45) Date of Patent: *Nov. 15, 2011

(54) MANAGING OUTGOING VOICEMAIL MESSAGES

(75) Inventors: Harry Hong-Lun Lai, Overland Park, KS (US); Sean M. Casey, Kansas City, MO (US); Woo Jae Lee, Manhattan, KS (US); Pujan K. Roka, Olathe, KS (US); Elizabeth V. Shaw, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 854 days.

This patent is subject to a terminal disclaimer.

(21) Appl. No.: 12/060,692

(22) Filed: Apr. 1, 2008

(51) Int. Cl.
*H04M 11/10* (2006.01)

(52) U.S. Cl. ....... 455/413; 455/67.7; 455/116; 370/493; 379/88.01; 379/88.03; 379/88.12

(58) Field of Classification Search ................. 455/413, 455/67.7, 116; 370/493; 379/88.01, 88.03, 379/88.12
See application file for complete search history.

(56) References Cited

U.S. PATENT DOCUMENTS

| | | | | |
|---|---|---|---|---|
| 2004/0102225 | A1* | 5/2004 | Furuta et al. | 455/566 |
| 2005/0186944 | A1* | 8/2005 | True et al. | 455/413 |
| 2006/0025113 | A1* | 2/2006 | Nguyen et al. | 455/412.1 |
| 2007/0206747 | A1* | 9/2007 | Gruchala et al. | 379/142.01 |
| 2008/0016575 | A1* | 1/2008 | Vincent et al. | 726/26 |
| 2009/0119100 | A1* | 5/2009 | Akella et al. | 704/235 |

OTHER PUBLICATIONS

Nortel Nortel Callpilot Apr. 14, 2008 http://products.nortel.com/cgi-bin/printer,cgi?language=en.
Faculty/Staff Voice Mail Services Apr. 14, 2008 http://www.telecom.ilstu.edu/telephone/voicemail_fx.shtml.
Microsoft Office Online Apr. 14, 2008 Microsoft Office Outlook with Business Contact Manager http://office.microsoft.com/en-us/contactmanager/FX101759331033.aspx?mode=print.
Microsoft Office Online Apr. 14, 2008 Microsoft Office Outlook Better together: do more with Microsoft Office Outlook 2007 and Exchange Server 2007 http://office.microsoft.com/en-us/outlook/HA101750111033.aspx?pid=CL100626971033....
Unibears Manage Voice Messages Guide Microsoft Office Online Apr. 14, 2008 http://unibears.berkeley.edu/cs/guide/voice-manage-pg.html.
Airtel-Vodafone—Channel Islands Mobile Services—Voicemail further information Apr. 14, 2008 http://www.airtel-vodafone.je/section/68/index.html.
iPhone User's Guide Apr. 14, 2008 www.apple.com/iphone.
Nortel Networks CallPilot Desktop Messaging 2004 http://products.nortel.com/cgi-bin/printer,cgi?language=en.

* cited by examiner

*Primary Examiner* — Nimesh Patel

(57) ABSTRACT

Embodiments of the invention provide ways to track the status of calls made to mobile devices. An illustrative method includes an originating mobile device receiving data from a mobile access network about an outgoing call, utilizing the data from the mobile access network to determine the outcome of the outgoing call, displaying an indicator of the outgoing call on the originating mobile device, and displaying an indicator of the outcome (connected, no answer, voicemail, busy, etc.) on the originating mobile device.

17 Claims, 10 Drawing Sheets

MANAGING OUTGOING VOICEMAIL MESSAGES

CROSS-REFERENCE TO RELATED APPLICATIONS

This application is related by subject matter to U.S. patent application Ser. No. 12/060,707 filed Apr. 1, 2008, now pending, entitled MOBILE CALL OUTCOME DISPLAY, herein incorporated by reference.

SUMMARY

The present invention is defined by the claims below, but summarily, embodiments of the present invention provide a system, method, and media for, among other things, displaying an indicator of the outcome of a call on either the originating mobile device or the destination mobile device. Embodiments of the present invention have several practical applications in the technical arts including verifying how a specific call ended or that a voicemail message was accessed or played.

In a first illustrative aspect, a set of computer-useable instructions facilitates a method that includes receiving data from a mobile access network concerning the outcome of an outgoing call. The mobile device utilizes data from the mobile access network to determine the outcome of the outgoing call and stores the outcome of the outgoing call. The mobile device accesses the stored outcome of the outgoing call and simultaneously displays an indicator identifying the outgoing call and an indicator identifying the outcome of the outgoing call.

In a second illustrative aspect, a set of computer-usable instructions provides for receiving data that a voicemail message has been left for a destination mobile device. The data may contain a timestamp of when the voicemail message was left, a reply period for when the user of the originating mobile device wants a response from the originating mobile device, or a preferred return call type for the type of call response, such as phone call, text messaging, or instant messaging. The voicemail message data and requested time period for reply are stored on the mobile originating mobile device. When the reply period expires, a check is done to determine whether the destination mobile device has not responded to the voicemail message and an indicator is displayed on the originating mobile device that a response has not been received.

In a third illustrative aspect, a set of computer-usable instructions provides a user interface displaying identifiers of outgoing calls in an outgoing call list area and identifiers for the outcome of the outgoing call in a status area.

In a fourth illustrative aspect, a set of computer-usable instructions provides for initiating a call from an originating mobile device and connecting to a mobile destination device. When the originating mobile device determines that the call for the destination device is being prompted to leave a voicemail message, the originating mobile device records the voicemail message and stores it on the mobile originating device for retrieval.

In a fifth illustrative aspect, a set of computer-usable instructions provides for receiving data from a mobile access network about an outgoing call. The received data is utilized to determine the outcome of the call. If the outcome of the call ended in a voicemail message, then a receipt message for the call originator is sent when the voicemail message is played on the destination mobile device. The receipt message is correlated with the indicator of the outgoing call and the indicator identifying that the voicemail message has been played. Indicators for the outgoing call, outcome of the outgoing call, and that the voicemail message has been played are simultaneously displayed on the mobile originating device.

In a sixth illustrative aspect, a set of computer-usable instructions provides for receiving an instruction that a voicemail message has been left for a destination mobile device. A data-set containing a timestamp of when the voicemail message was left, a reply timestamp for when the user of the originating mobile device desires a response and a preferred return call type for the type of call response the user of the originating mobile device desires, such as phone call, text messaging, or instant message. The reply timestamp and preferred return call type is set on the destination mobile device. When the reply timestamp expires, a check is done to determine whether the destination mobile device has not responded to the voicemail message with a call type specified in the preferred return call type. An indicator is displayed on the destination mobile device that has not responded in time, with the preferred return call type.

In a seventh illustrative aspect, a set of computer-usable instruction provides for associating a data-set with a voicemail message set by the originating mobile device, where the data-set contains a timestamp of when the voicemail message was left, a reply timestamp for when the call originator wants a response to the message, and a preferred return call type for the type of call response the call originator wants in reply, such as a phone call, a text message, an email message or instant message. The reply time and the preferred return call type are set by the mobile originating device, and instructions with information concerning the data-set are sent to the destination mobile device. When the reply timestamp expires, a check is done on the originating mobile device for a response from the destination mobile device and searches for the call type specified in the preferred return call type. An indicator on the originating mobile device is displayed that the destination mobile device has not responded in time, with the preferred return call type.

In a final illustrative embodiment, a set of computer-usable instructions provides for receiving a set time period for an originating mobile device to contact a destination mobile device. The set time period is stored on the originating mobile device, and may be received from a network or entered manually by the user of the originating mobile device. The originating mobile device determines whether contact has been made to the destination mobile device within the set time period. An indicator is displayed to inform the user that the destination mobile device has not been contacted by the originating mobile device within the set time period parameter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| CD-ROM | Compact Disk Read Only Memory |
| DVD | Digital Versatile Discs |
| CDMA | Code Division Multiple Access |
| EEPROM | Electrically Erasable Programmable Read Only Memory |
| GSM | Global System for Mobile communications |
| IEEE | Institute for Electrical and Electronics Engineers |
| RAM | Random Access Memory |
| ROM | Read Only Memory |

Further, various technical terms are used throughout this description. An illustrative resource that fleshes out various aspects of these terms can be found in Newton's Telecom Dictionary by H. Newton, $22^{nd}$ Edition (2006).

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media; RAM, ROM, EEPROM, flash memory or other memory technology; CD-ROM; digital versatile discs (DVD); holographic media or other optical disc storage, magnetic cassettes, magnetic tape, magnetic disk storage, and other magnetic storage devices. These technologies can store data momentarily, temporarily, or permanently.

Illustrative aspects of the invention will be described in greater detail below. Listing some aspects should not be construed as an indication that other aspects do not exist. The following describe computer-readable media having computer executable instructions, computer-implemented methods and computing systems.

Figure 1:
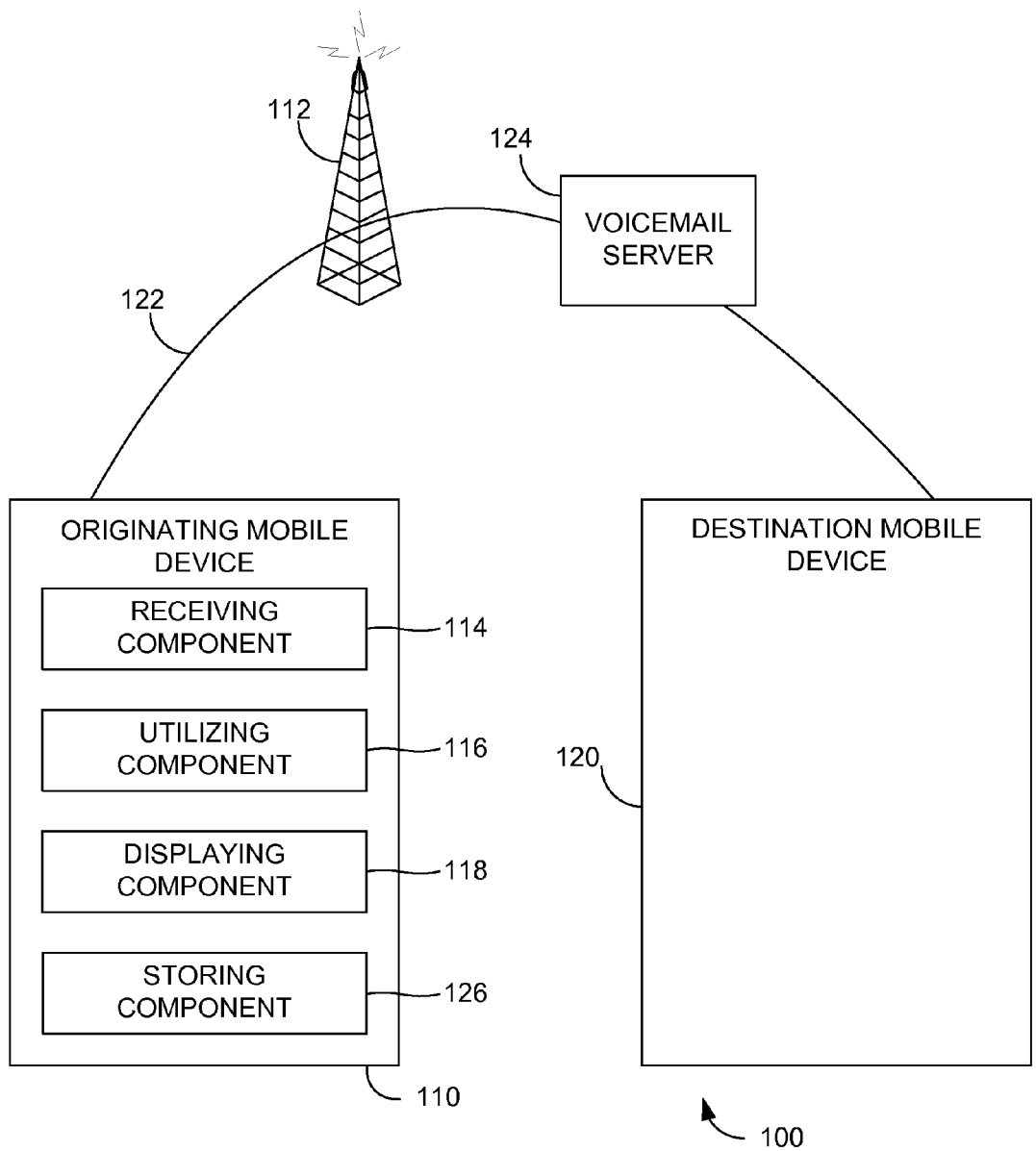
FIG. 1 depicts an operating environment suitable for practicing an embodiment of the present invention.

Turing now to FIG. 1, an operating environment suitable for practicing an embodiment of the present invention is provided and referenced generally by the numeral 100. An originating mobile device may be a mobile phone, personal data assistant, a smart phone, or any other consumer-electronics device that is capable of making and receiving telephone calls by way of a mobile access network 112. The same can be said for a destination mobile device 120. As illustratively shown, originating mobile device 110 includes a receiving component 116, a utilizing component 116, and a displaying component 118 and a storing component 126. It will be appreciated that there may be any number of components and that the components may reside on the network 112, the originating mobile device 110, or the destination mobile device 120.

Although other connections leading to the mobile access network 112 are not shown, all embodiments of the present invention utilize wireless communications networks including, but not limited to, Code Division Multiple Access (CDMA), Global System for Mobile communications (GSM), or Institute for Electrical and Electronics Engineers (IEEE) standard 802.11. The originating mobile device communicates to the destination mobile device 120 via a communications pathway 122. The communications pathway could be defined by the CDMA, GSM, or IEEE standards bodies for voice communications.

In some embodiments, voicemail server 124 is within the mobile access network 112. Voicemail server 124 may reside on the originating mobile device 110 or the destination mobile device 120. Locating the voicemail server on the mobile devices (110, 120) allows for voicemail messages to be saved directly on the originating mobile device 110.

The receiving component 114 receives data from mobile access network 112 about an outgoing call responding to a call being connected, terminated, transferred, reset or busy. The data received by the mobile device could include, but is not limited to, caller identifier, callee identifier, and call-state. This data may include data from the CDMA or GSM protocols. The call-states may include call connected, call terminated, call transferred, call reset, or busy. A call transferred call-state could be used to determine whether a voicemail server 124 was used in leaving a voicemail message. Another mechanism for determining whether a voicemail message is being left is to utilize sound recognition software to interpret the characteristic beep or tone of an answering machine or voicemail server as indication of the call being transferred to voicemail.

The utilizing component 116 determines the outcome of the call by processing data, such as caller identifier, callee identifier and call-state information gathered from the mobile access network 112. An indicator of the stored outcome of the call is displayed by the displaying component 118 to show an identifier identifying the outcome of the call and an identifier identifying the outgoing call. The storing component 126 stores the outcome of the call along with the called number for retrieval at a later time. For example, one day after the call was placed the mobile user may want to know the outcome of the call. Possible call outcomes that get displayed may include call connected, call terminated, call transferred, call reset, or busy.

Figure 2:
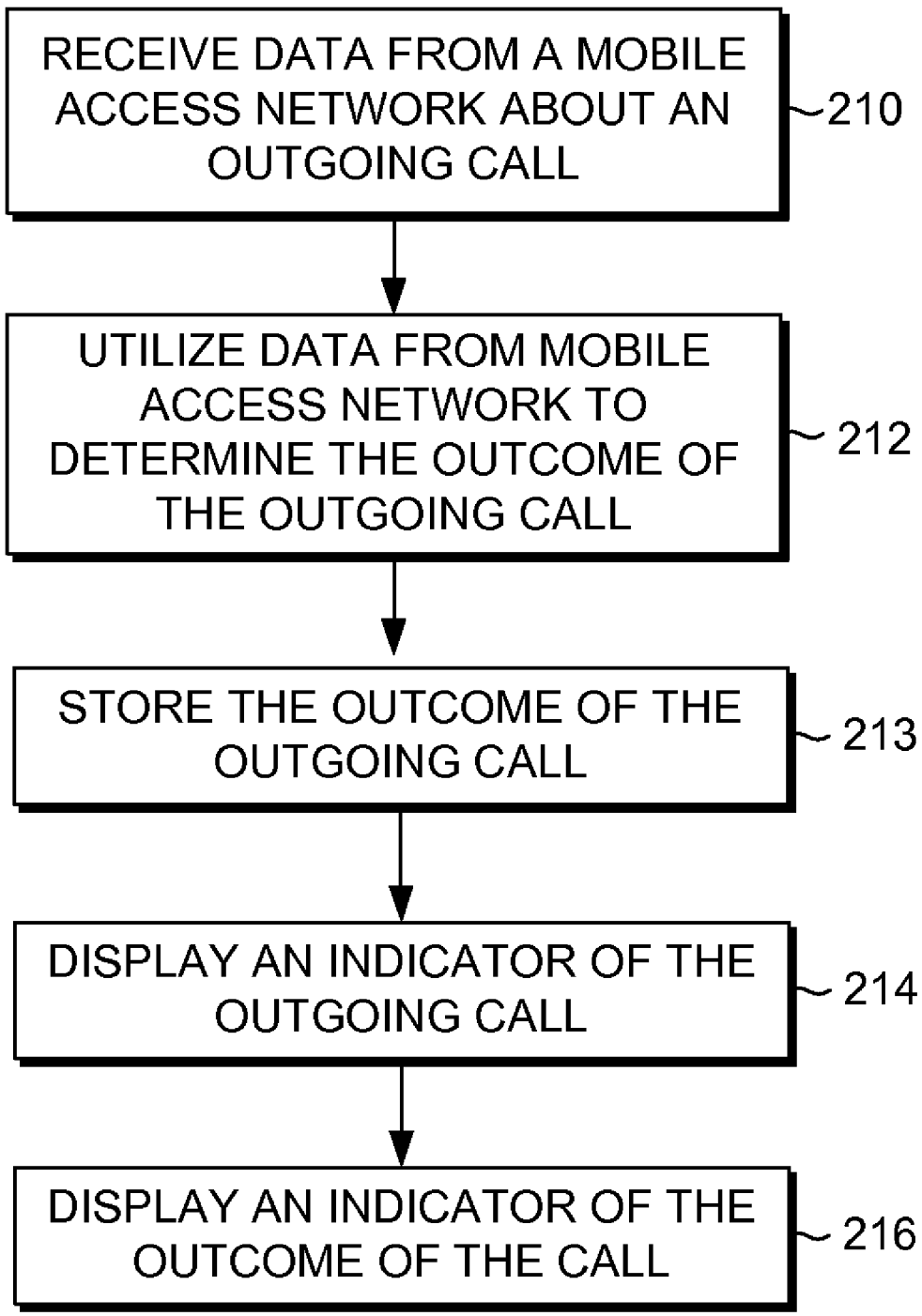
FIG. 2 depicts a flowchart that illustrates a method for displaying an indicator of the outcome of a call according to an embodiment of the present invention.

Turning now to FIG. 2 (and referencing FIG. 1 as well), a flowchart depicting a method for displaying an indicator of the outcome of a call is generally referenced by the numeral 200. The devices and steps in FIG. 2 are similar to the devices previously discussed.

At step 210, an originating mobile device 110 receives data from a mobile access network 112. The data can be gathered from the mobile access network 112 protocols, such as CDMA or GSM. At step 212, the originating mobile device 110 utilizes the data from the mobile access network 112 to determine the outcome of the outgoing call by parsing data and interpreting codes received from the mobile access network 112. A few of the possible outcomes of the call would be connected, transferred to voicemail, no answer, and busy. At step 213, the originating mobile device 110 stores the data parsed from the mobile access network 112 in the storing component 126.

At step 214, the originating mobile device 110 displays an indicator of the outgoing call. Indicators used for identifying to whom the outgoing call was made may include be a contact name, phone number, or another user-defined indicator associated with the destination device. At step 216, the origination mobile device 110 accessed the stored outcome of the call. An indicator of the outcome of the outgoing call is displayed adjacent to and simultaneously with the indicator identifying the outgoing call.

Figure 3:
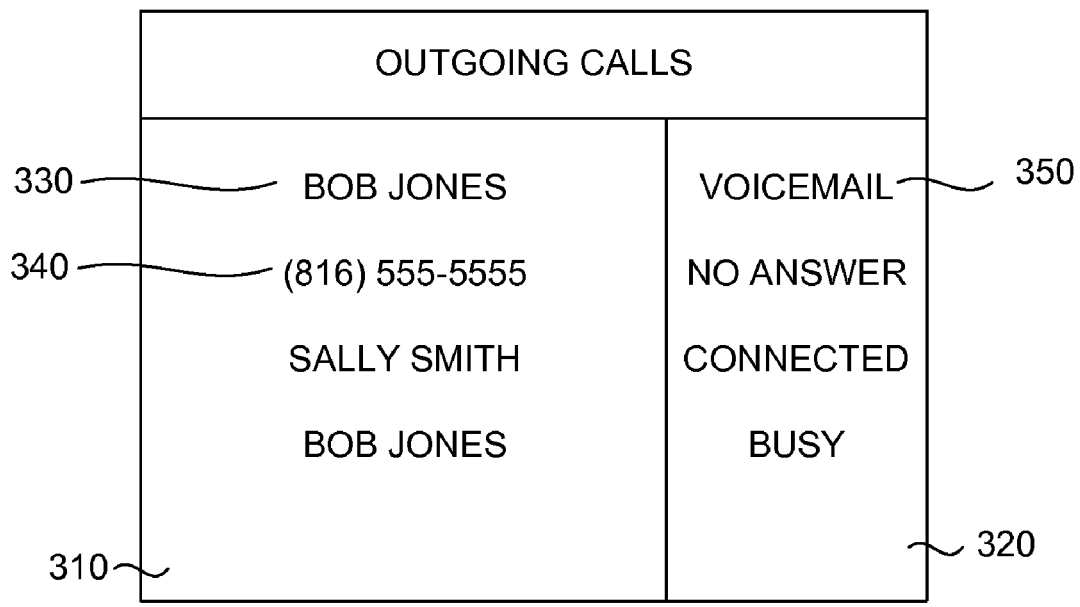
FIG. 3 depicts an illustrative screen display, in accordance with an embodiment of the present invention, of a user interface displaying an identifier of the outgoing call and an identifier for the outcome of the call.

Turning now to FIG. 3, an illustrative screen display of an interactive electronic graphical user interface on an outgoing originating mobile device showing an identifier for the calling device and an identifier for the outcome of the call and is referenced generally by the numeral 300. Generally, the exemplary user interface 300 comprises an outgoing call list area 310 and a status area 320. The outgoing call list area displays an indicator of the outgoing call. The indicators of the outgoing call can be shown as a name 330, a phone number 340, or other user-defined indicator of a destination device 120. These indicators may be representations the user has stored in the originating mobile device's 110 contact application, such as pictures or icons that have been associated with a destination device.

The status area 320 comprises outgoing call indicators 350 identifying the outcome of a call from the originating mobile device 110 to a destination mobile device 120. These indicators are generated from the data received from the mobile access network 112 at step 210. There could be several call-states displayed as the outcome of the outgoing call, such as voicemail, no answer, connected, or busy, and these call-state may be represented by text, pictures, or icons as well.

Figure 4:
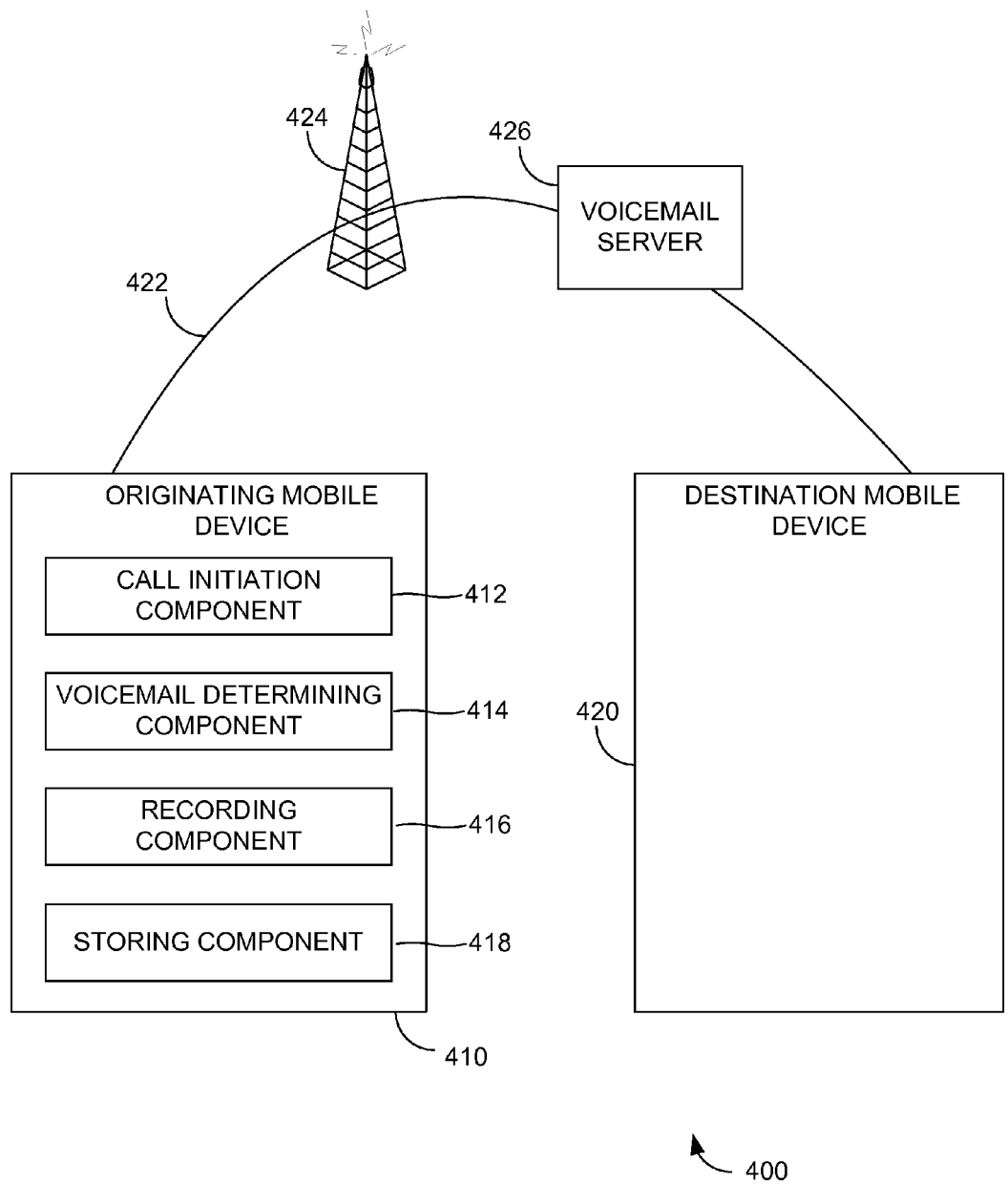
FIG. 4 depicts an operating environment suitable for practicing an embodiment of the present invention.

Turning now to FIG. 4, an operating environment suitable for practicing an embodiment of the present invention is provided and referenced generally by the numeral 400. An originating mobile device 410 comprises a call initiation component 412, a voicemail determining component 414, a recording component 416, and a storing component 418. It will be appreciated that there may be any number of components and that the components may reside on the network 424, the originating mobile device 410, or the destination mobile device 420. The call initiation component 412 initiates a call from the originating mobile device 410 to a destination mobile device 420.

The originating mobile device 410 connects to the destination mobile device 420 via a communications pathway 422 that uses a mobile access network 424 for transport. The mobile access network 424 may be any wireless network, including but not limited to, CDMA, GSM, or IEEE 802.11. Voicemail server 426 is depicted as residing on network 424; however, the voicemail server 426 is not limited to being within the mobile access network 424 and may reside on the mobile devices 410 or 420.

While the originating mobile device 410 is connected to the destination mobile device 420, voicemail determining component 412 determines whether the originating mobile device 410 is being prompted to leave a voicemail message for the destination mobile device 420. The determination that is used by the originating mobile device 410 is being prompted to leave a voicemail may included data from the network indicating a transfer to voicemail, utilizing sound recognition software to interpret a characteristic beep or tone of a voicemail, an application recording device or answering machine. Another mechanism voicemail determining component 414 may utilize is if the call from the originating mobile device 40 to the destination mobile device 420 is transferred or redirected.

Once the voicemail determining component 414 has determined that the originating mobile device 410 has been prompted to leave a voicemail, the originating mobile device 410 records the message being left by the user of the originating mobile device 410 on the originating mobile device 410. The recorded voicemail message is a separate or additional recording of the voicemail message left for the destination mobile device 420. Thus the message is recorded for the destination mobile device 420. The recorded voicemail message is stored for retrieval by the originating mobile device 410, and is the originating mobile device's record of the voicemail. The recorded voicemail message may be stored on the originating mobile device 410, or within the mobile access network 424. If stored on the mobile access network 424, the recording may be stored in the originating mobile device's personal voicemail.

Figure 5:
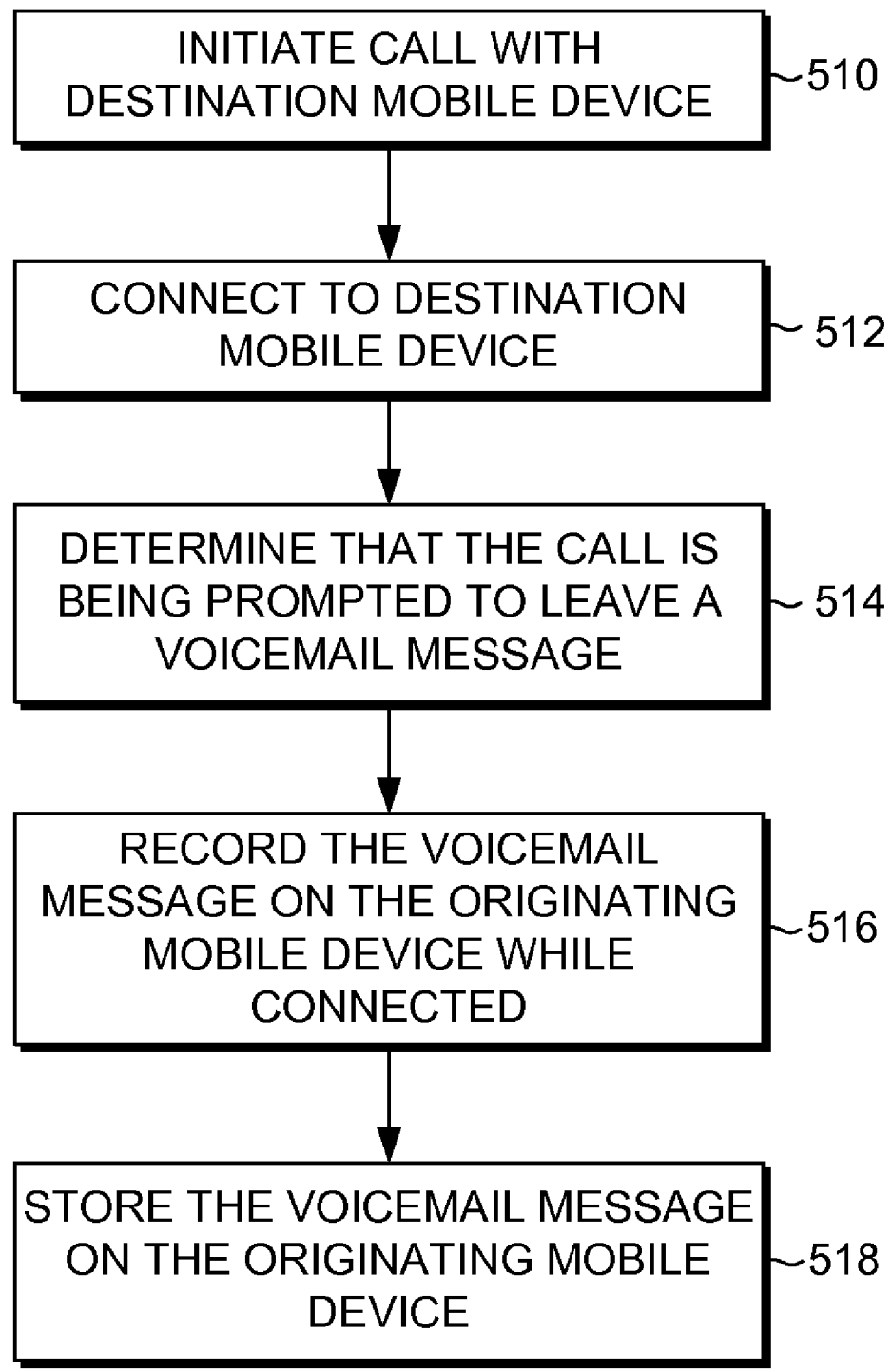
FIG. 5 depicts a flowchart that illustrates a method for storing a copy of the voicemail message, intended for the destination mobile device, on the originating mobile device according to an embodiment of the present invention.

Turing now to FIG. 5, a method 500 for storing a copy of a voicemail message, intended for the destination mobile device 420 on the originating mobile device 410 and is described.

At step 510, originating mobile device 410 initiates a call with the destination mobile device 420. At step 512, the originating mobile device 410 is connects to destination mobile device 420. Once a connection has been established between the mobile originating device 410 and the destination mobile device 420.

At step 514, it is determined if the originating mobile device 410 is being prompted to leave a voicemail message for the destination mobile device 420. It will be appreciated that there may be any number of components that may perform step 514 and that the components may reside on the network 424, the originating mobile device 410, or the destination mobile device 420. One such example would be to have the originating mobile device 410 listen for the voicemail prompt, such as a beep or tone. The voicemail determining component 414 would use the prompt to determine that a voicemail message is being left.

At step 516, the recording component 416 records the voicemail message left by the user of the originating mobile device 410 that is intended for the user of destination mobile device 420 while the originating mobile device 410 and destination mobile device 420 are connected. The voicemail message recorded by the originating mobile device 410 is a different and separate recording from the voicemail message left for the destination mobile device 420. This recording is done without user interaction at the time of the call. The user does not have to press anything to record the message left on the originating mobile device 410, it is done automatically in response to the determination that a voicemail is to be left. At step 518 the voicemail message recorded by the originating mobile device 410 is stored. The voicemail mail message recording may be stored directly on the originating mobile device 410, or on a voicemail server 426 of the originating mobile device 410. The voicemail recording may be played later by the user of the originating mobile device 410. An indicator or icon may be provided to display the association between the recording left for the mobile destination mobile device, an outgoing call indicator, and the outcome of the outgoing call indicator.

Figure 6:
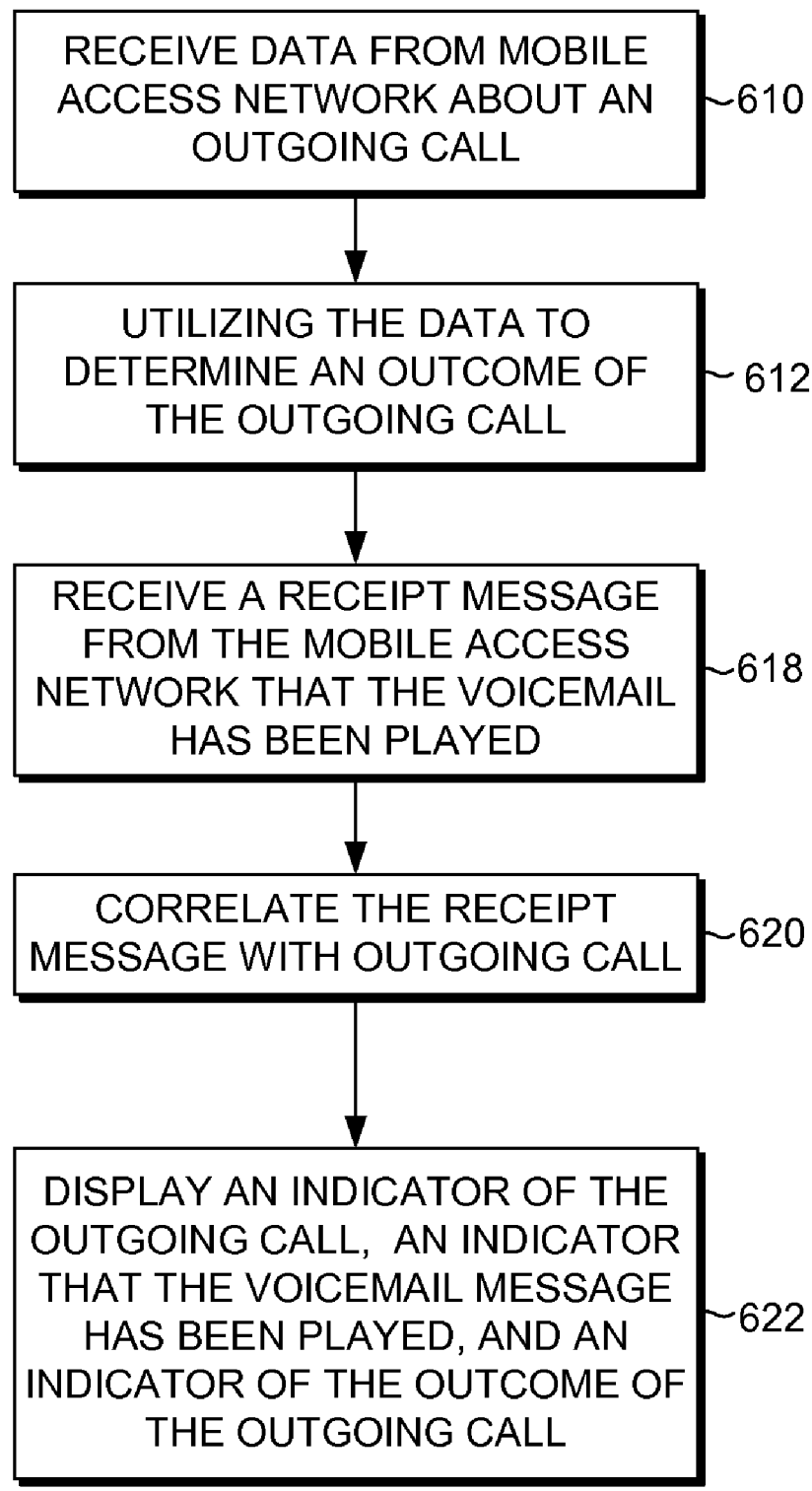
FIG. 6 depicts a flowchart that illustrates a method for displaying an indicator that a destination mobile device has played a voicemail left by an originating mobile device according to an embodiment of the present invention.

Turning to FIG. 6, a method that illustrates displaying an indicator that a destination mobile device 120 has played a voicemail left by an originating mobile device 110 and is referenced generally as numeral 600.

At step 610 the originating mobile device 110 receives data from the mobile access network 112 about an outgoing call. The receiving component 114 of the originating mobile device 110 may perform this function. The data may be gathered from the mobile access network 112 protocols, such as CDMA or GSM, which contains a call-state for the outgoing call. Some examples of call-states may be connected, no answer, voicemail, or busy.

At step 612, the originating mobile device 110 utilizes the data from the mobile access network 112 to determine the outcome of the outgoing call by parsing data and interpreting codes received from the mobile access network 112. The utilizing component 116 may determine of the outcome of the outgoing call, but it will be appreciated that the determining step may be performed by any number of components and that the components may reside on the network 112, the originating mobile device 110, or the destination mobile device 120.

At step 618, the originating mobile device 110 receives a receipt message from the destination mobile device 120 that a voicemail message was played. The receipt message is associated with the voicemail message that was left by the originating mobile device 110 and would contain the information necessary to correlate the receipt message with the outgoing call. At step 620, the receipt message is correlated with caller identifier. Some parameters parsed from the mobile access network 112, and the receipt from mobile originating device 110 that may accomplish the correlation of the receipt message may be the call outcome, the caller identifier, the callee identifier, the day and time that the voicemail message was received, and the day and time the voicemail message was played.

At step 622, indicators for the outgoing call, the outcome of the outgoing call, and the voicemail message has been played are displayed. The indicator representing the outgoing call may be a name 716, a phone number 718, or a user-defined indicator. The indicator for the outcome of the outgoing call may be the call-state of the outgoing call. Some examples of the outcome of the outgoing call indicator would be connected, no answer, voicemail, or busy. The indicator for displaying that a voicemail message has been played shows the user of the originating mobile device 110 that the voicemail message left for the destination mobile device 120 has been played.

Figure 7:
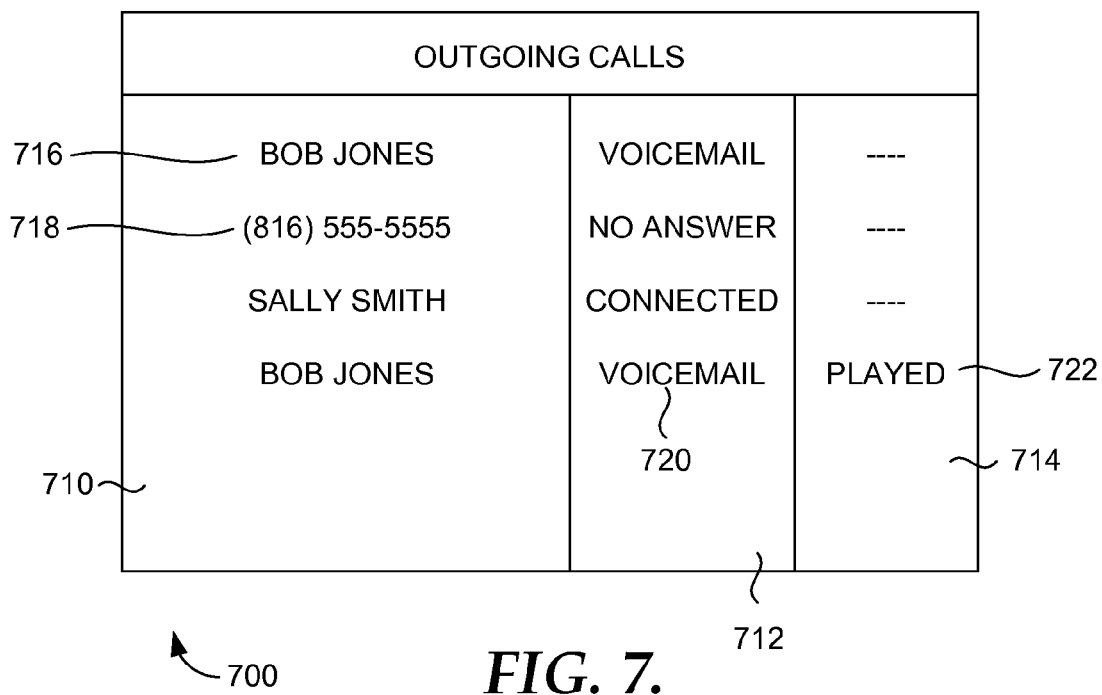
FIG. 7 depicts a illustrative screen display, in accordance with an embodiment of the present invention, of an user interface displaying an identifier of the outgoing call, an identifier for the outcome of the call, and indicating whether the voicemail call outcomes have been played by the destination mobile device.

Turning now to FIG. 7 an illustrative an interactive screen display of a graphical user interface showing an identifier for the calling device, an identifier for the outcome of the call, and whether the voicemail call outcomes have been played by the destination mobile device 120 is provided and generally referenced as numeral 700.

Generally, the exemplary user interface 700 comprises an outgoing call list area 710, a status area 712, and a voicemail played area 714. The outgoing call list displays an indicator of the outgoing call. The indicators of the outgoing call may be a name 716, a phone number 718, or any other user-defined indicator identifying the destination mobile device. One such example of a user-defined indicator would be a thumbnail image. This thumbnail image could be retrieved from the contact application on the originating mobile device 110. The status area 712 comprises indicators 720 identifying the outcome of the outgoing call from the originating mobile device 110 to the destination mobile device 120. There may be several different types of call outcomes for the call. Some examples of outcome of the outgoing call types would be connected, no answer, voicemail, or busy.

The outcome of the outgoing call types could be generated from data received from the mobile access network 112. The data from the mobile access network 112 provided to the originating mobile device 110 comes from the CDMA or GSM protocol that captures call-state.

The voicemail played area 714 is comprised of a played indicator 722 that suggests that a voicemail has been played. The played indicator 722 is triggered by the destination mobile device 120 playing the voicemail left by the originating mobile device. The played indictor 722 is correlated to the outgoing call that ended in a voicemail message.

Figure 8:
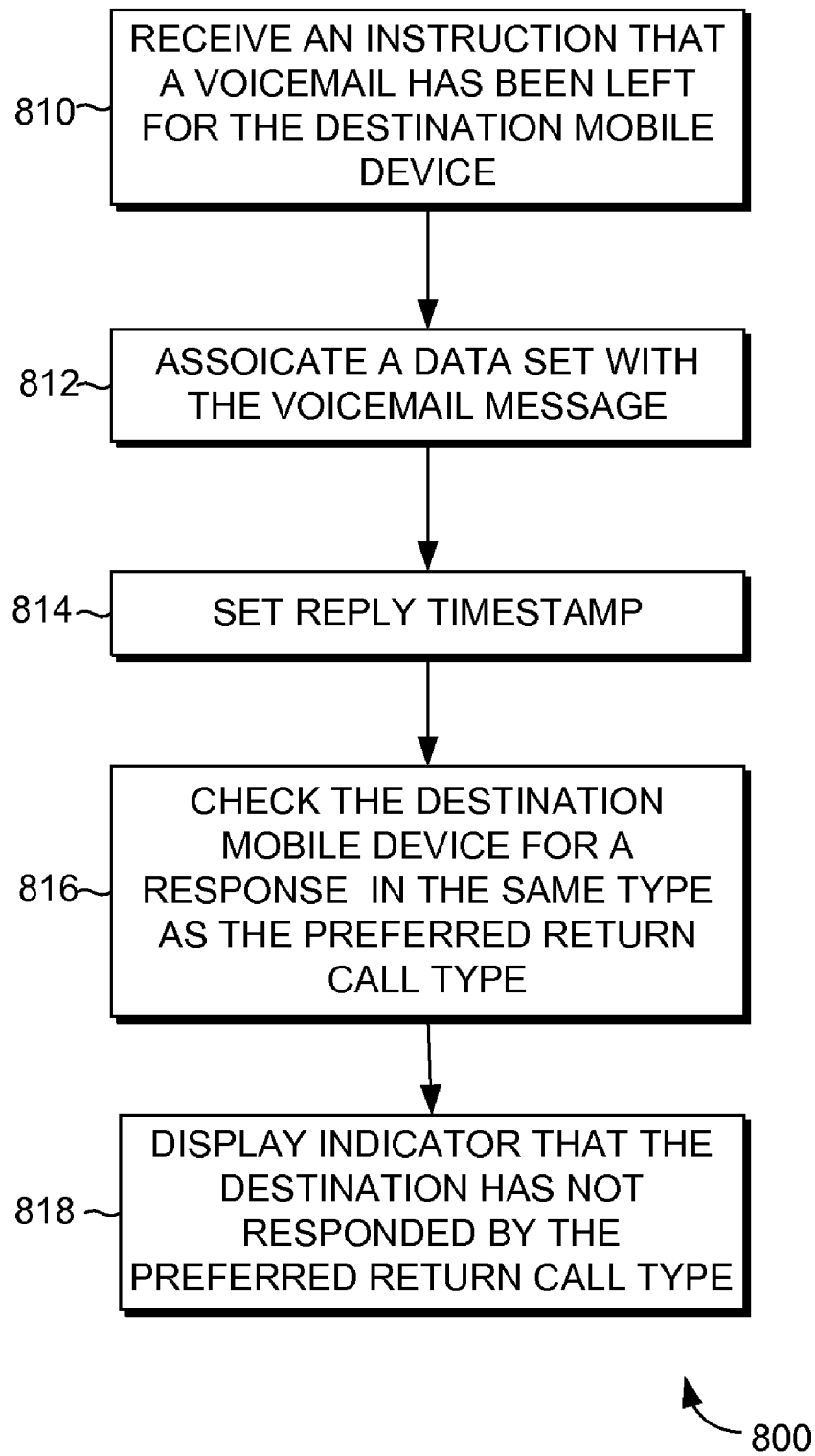
FIG. 8 depicts a flowchart that illustrates a method for displaying an indicator on an originating mobile device that the destination mobile device has not responded with the preferred return call type according to an embodiment of the present invention.

Turning now to FIG. 8, a flowchart illustrating displaying an indicator on a destination mobile device 120 that the destination mobile device 120 has not responded with the preferred return call type and is referenced generally as numeral 800.

At step 810, a destination mobile device receives an instruction that a voicemail has been left by originating mobile device. At step 812, a data-set is associated with the voicemail message. The data-set may contain a timestamp, a reply timestamp, and a preferred return call type. It will be appreciated that there may be other information that is part of the data set, such as a network identifier and an urgent priority identifier. The timestamp indicates when the destination mobile device received the voicemail message from the originating mobile device, the reply time is when the user of the originating mobile device would like a response to the voicemail message, and the preferred return call type is the call type on how the user wishes to respond to the originating mobile device. Examples of some preferred return call types would be, call, text message, voicemail, instant message, some or all of the call types.

At step 814, the user of the destination mobile device sets a reply timestamp. The reply time stamp allows for the originating mobile device user to request a time for a response to be returned to them. This timestamp could be a day and time, or a relative time, such as one week from today. At step 816, the reply timestamp expires, and the destination mobile device checks for a response from the destination mobile device that matches the preferred return call type. The destination mobile device could check its outgoing outboxes for phone calls, text messages, or instant messages that match the preferred return call type and are from the destination mobile device.

At step 818, a indicator is displayed that tells the user that a response to the originating mobile device has not been made in the preferred return call type and is past the time set in the reply timestamp. The display indicator could be a pop-up message, a flashing icon, or some other notification technique.

Figure 9:
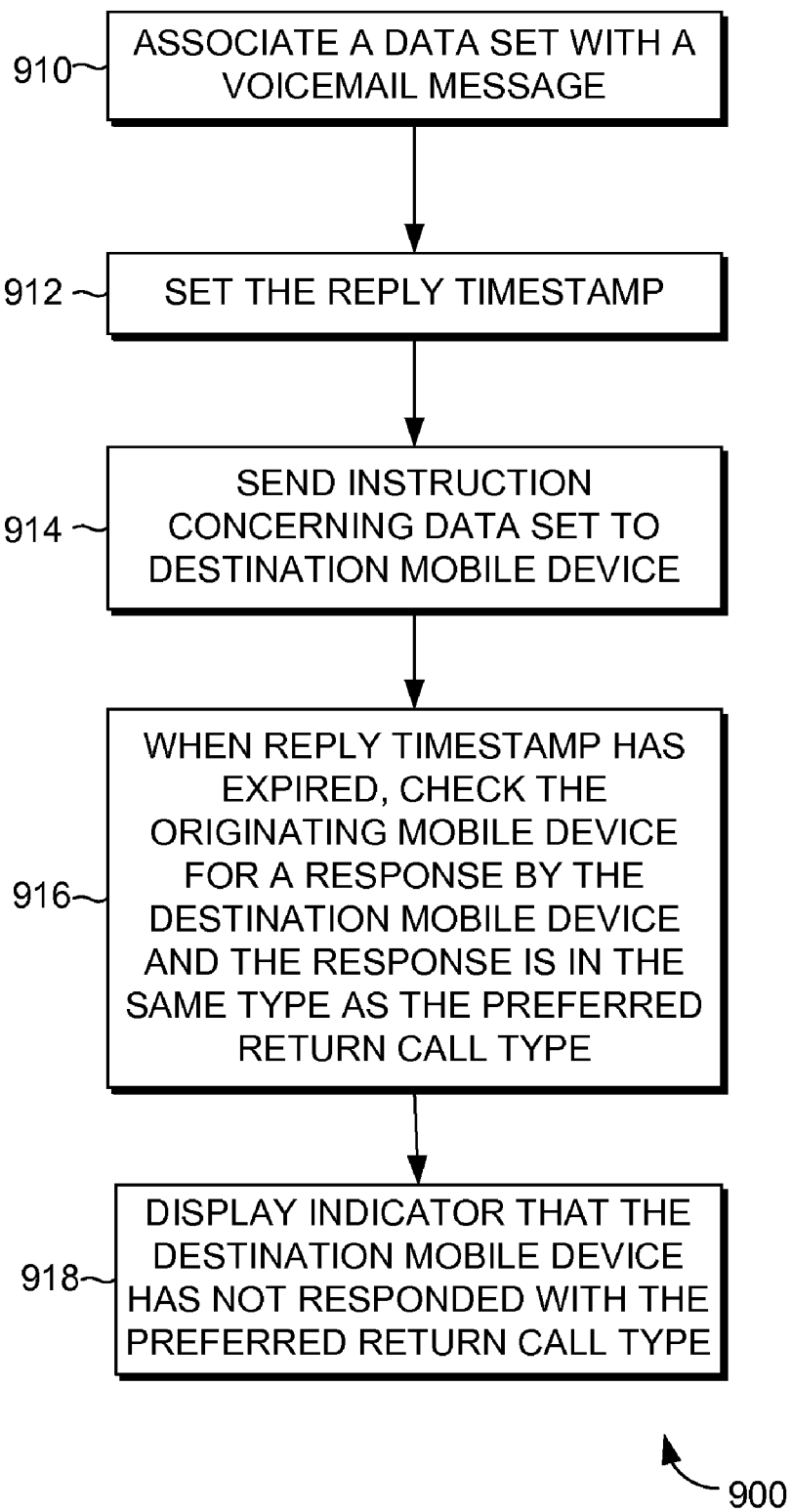
FIG. 9 depicts a flowchart that illustrates a method for displaying an indicator on the destination mobile device that the destination mobile device has not responded with the preferred return call type according to an embodiment of the present invention.

Turning now to FIG. 9 (and referencing FIG. 1), a flowchart that illustrates displaying an indicator on the originating mobile device that the destination mobile device has not responded with the preferred return call type and is referenced generally as numeral 900.

At step 910, the originating mobile device associates a data-set with a voicemail message intended for a destination mobile device. The data-set could contain a timestamp, a reply timestamp, and a preferred return call type. These are not the only items that the data-set could contain. There may be other items such as a network identifier or priority identifier included within the data-set.

At step 912, the user sets a reply timestamp for a response by the destination mobile device. The reply timestamp could be a day and time, or reflect a relative time, such as one week from today. Also, the user may optionally set the preferred return call type. Setting this field allows the user of originating mobile device to choose how they wish to have the user of the destination mobile device respond.

At step 914, the originating mobile device sends an instruction informing the destination mobile device of the information in the data-set. This instruction allows for the voicemail message to have an expiration date and notification on the destination mobile device that corresponds to the wishes of the user of the originating mobile device.

At step 916, the reply timestamp set by the user of the originating mobile device expires, and the originating mobile device checks its log files and inboxes for a response from the destination mobile device. The checking process is also looking for a response in the same type as indicated in the preferred return call type.

At step 918, an indicator is displayed to the user of the originating mobile device that the destination mobile device has not responded with the call type set in the preferred return call type. This indicator could be a pop-up indicator, a flashing icon, or other type of notification indicator.

Figure 10:
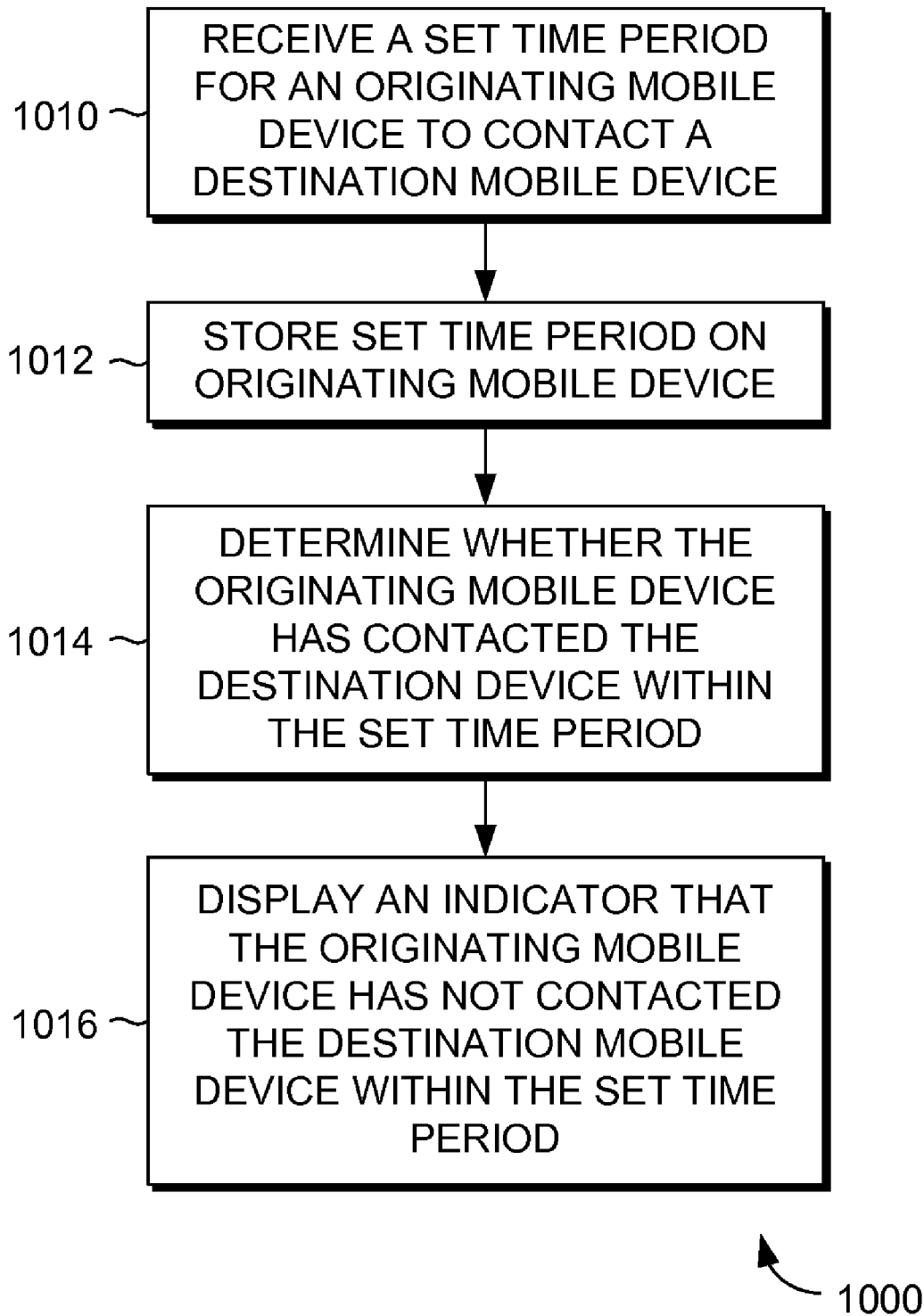
FIG. 10 depicts a flowchart that illustrates a method for displaying an indicator on the originating mobile device that has not contacted the destination mobile device in a set period of time.

Turning now to FIG. 10, a flowchart illustrating a computer-implemented method for displaying an indicator on the mobile originating device 110 that a destination mobile device 120 has not been contacted within a set time period and is generally referenced as numeral 1000.

At step 1010, an originating mobile device receives a set time period which is used to inform the user to contact the destination mobile device. The set time period may be received from a network 112 or entered by the user of the originating mobile device. If the set time period is received by a network, information about the destination mobile device could be captured and associated automatically to the set time period received. If the user of the originating mobile device enters a set time period manually, then the association of destination mobile device information could be manually, capture from a call log, or selected from a contact list.

At step 1012, the set time period is stored on the originating mobile device in the storing component 126. As the set time period is stored, the mobile originating device will associate the set time period with a destination mobile device.

At step 1014, the originating mobile device determines whether it has contacted the destination mobile device within the set time period. The originating mobile device will keep track of the set time period as related to the current day and time of the device. When the set time period has exceeded the current day and time of the device, the originating mobile device determines whether the destination mobile device has been contacted. One mechanism for determining if the destination mobile device has been contacted is to use the call log of the originating mobile device and compare destination mobile device address and time stamps to the destination mobile device address and the set time period stored in the storing component 126.

At step 1016, the originating mobile device displays an indicator that it has not contacted the destination mobile device within the set time period. The indicator used to inform the originating mobile device user may be a pop-up indicator containing text and icons.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more nontransitory computer-readable media having computer-useable instructions embodied thereon for performing a method of displaying an indicator that the voicemail message has played, the method comprising:
   receiving at an originating mobile device data via a mobile access network about an outgoing call, the outgoing call originating at an originating mobile device and sent to a destination mobile device;
   receiving at the originating mobile device a message via the mobile access network that a voicemail message associated with the outgoing call has been played;
   associating the played message with the outgoing call; and
   simultaneously displaying at the originating mobile device an indicator identifying the outgoing call, an indicator of an outcome of the outgoing call, and an indicator that the voicemail message has been played, wherein displaying comprises:
   (a) receiving a call-state within the data, wherein the call-state includes at least one of call connected, call terminated, call transferred, call reset, or busy;
   (b) parsing the data to extract the outcome of the outgoing call, wherein the outcome reveals the call-state;
   (c) displaying the indicator identifying of the outgoing call a call list area of a user interface (UI); and
   (d) displaying the indicator of the outcome in a status area of the UI, wherein the outgoing call and the outcome indicators are visually associated with each other.

2. The media of claim 1, wherein the voicemail message is played by the user of a destination mobile device.

3. The media of claim 2, wherein the voicemail message is played by the destination mobile device.

4. The media of claim 1, wherein the data is Code Division Multiple Access (CDMA) or Global System for Mobile Communication (GSM) data.

5. The media of claim 1, wherein the method further comprises:
utilizing electronic sound recognition to determine that a tone or beep of an answering machine or a voicemail server indicates that the outcome of the call is voicemail.

6. The media of claim 1, wherein the method further comprises:
identifying the outgoing call by one or more of call number for the outgoing call, destination device identifier of the outgoing call, or time of the outgoing call.

7. The media of claim 1, wherein the indicator of the outcome of the outgoing call is one or more of text, a picture or an icon.

8. The media of claim 1, wherein the outcome of the call is stored on the originating mobile device.

9. The media of claim 1, wherein the method further comprises receiving from the originating mobile device a type of reply desired by the user of the originating mobile device.

10. The media of claim 9, wherein the type of reply desired is one or more of a return telephone call, return text message, return voicemail, return electronic mail and return instant message.

11. The media of claim 10, wherein the method further comprises:
determining whether the user destination mobile device has replied according to the type of reply desired by the user of the originating mobile device; and
displaying an indicator that the destination mobile device has not replied according to the type of reply desired by the user of the originating mobile device.

12. The media of claim 1, wherein the method further comprises displaying the indicator that the destination mobile device has not responded to the voicemail message left by the originating mobile device within a requested time period for reply on the destination mobile device.

13. The media of claim 12, wherein the method further comprises displaying an indicator that the destination mobile device has not responded to the voicemail message left by the originating mobile device within the requested time period for reply on the originating mobile device.

14. The media of claim 1, the method further comprising receiving data from a mobile access network about an outgoing call to the destination mobile device, the outgoing call originating at the originating mobile device; and utilizing the data to determine identify the destination mobile device and a time of the outgoing call.

15. The media of claim 14, the method further comprising:
storing on the originating mobile device the identification of the destination mobile device and the time of the outgoing call to the destination mobile device; and
utilizing the identification of the destination mobile device and the time the outgoing call to the destination mobile device to determine whether the originating mobile device has contacted the destination mobile device within a set time period.

16. The media of claim 1, the method further comprising:
receiving at the originating mobile device data that the voicemail message has been left for the destination mobile device by the originating mobile device;
sending to the destination mobile device a requested time period for reply to the voicemail message from the originating mobile device;
storing at the originating mobile device the voicemail message data and the requested time period for reply to the voicemail message;
employing the originating mobile device to determine whether the destination mobile device has replied within the requested time period for reply; and
displaying at the originating mobile device an indicator that the destination mobile device has not responded to the voicemail message left by the originating mobile device within the requested time period for reply.

17. The media of claim 1, the method further comprising:
receiving at the originating mobile device a set time period for the originating mobile device to contact the destination mobile device;
determining whether the originating mobile device has contacted with the destination mobile device within the set time period; and
displaying at the originating mobile device an indicator that the originating mobile device has not contacted the destination mobile device within the set time period.

* * * * *